United States Patent
Hasan et al.

(10) Patent No.: US 10,135,685 B2
(45) Date of Patent: Nov. 20, 2018

(54) UNDOING CHANGES MADE TO A COMMUNICATION NETWORK

(71) Applicant: EDEN ROCK COMMUNICATIONS, LLC, Bothell, WA (US)

(72) Inventors: Monjurul Hasan, Bothell, WA (US); Jaime Barnes, Bothell, WA (US); Timothy Treptow, Bothell, WA (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 518 days.

(21) Appl. No.: 14/268,763

(22) Filed: May 2, 2014

(65) Prior Publication Data

US 2015/0106339 A1    Apr. 16, 2015

Related U.S. Application Data

(60) Provisional application No. 61/889,138, filed on Oct. 10, 2013.

(51) Int. Cl.
   *G06F 15/177*    (2006.01)
   *G06F 11/14*    (2006.01)
   (Continued)

(52) U.S. Cl.
   CPC .......... *H04L 41/0863* (2013.01); *G06F 11/14* (2013.01); *H04L 41/0813* (2013.01);
   (Continued)

(58) Field of Classification Search
   CPC ............. H04L 41/0823; H04L 41/5022; H04L 41/0863; H04L 41/0672; H04L 41/0213;
   (Continued)

(56) References Cited

U.S. PATENT DOCUMENTS 6,041,350 A    3/2000  Takimoto
7,536,400 B2 *  5/2009  Pasumansky ..... G06F 17/30554
(Continued)

FOREIGN PATENT DOCUMENTS

CN    103222220 A    7/2013
EP    2 905 982 A1    8/2015
(Continued)

OTHER PUBLICATIONS

International Search Report and Written Opinion for PCT/US2014/036653, filed on May 2, 2014.
(Continued)

*Primary Examiner* — Jungwon Chang

(57) ABSTRACT

Systems and methods for undoing changes or modifications made to a communication network are described. In some embodiments, the systems and methods access a request to rollback one or more changes made to parameters of managed objects associated with a communication network within a given time period, retrieve information identifying the one or more changes made to the parameters of the managed objects within the given time period, and, for each managed object, determine a cumulative changetype (e.g., add, deleted, or update) associated with the one or more changes made to the parameters of the managed object and perform an action to apply the determined cumulative changetype to the managed object.

15 Claims, 6 Drawing Sheets

(51) Int. Cl.
*H04L 12/24* (2006.01)
*H04L 12/26* (2006.01)
*H04W 24/02* (2009.01)

(52) U.S. Cl.
CPC ...... *H04L 41/0823* (2013.01); *H04L 41/0853* (2013.01); *H04L 41/0859* (2013.01); *H04L 41/5022* (2013.01); *H04L 43/08* (2013.01); *H04W 24/02* (2013.01)

(58) Field of Classification Search
CPC ............. H04L 41/0853; H04L 41/0813; H04L 41/0859; H04L 43/08; H04W 24/02; H04W 24/04; H04W 36/04; G06F 17/243; G06F 11/1464
USPC ........ 709/227, 220, 221, 223; 455/446, 522, 455/405, 435.1; 370/332, 331, 216, 252; 715/226
See application file for complete search history.

(56) References Cited

U.S. PATENT DOCUMENTS

| | | | |
|---|---|---|---|
| 8,406,759 | B2 | 3/2013 | Ryan et al. |
| 2003/0105761 | A1 | 6/2003 | Lagerman |
| 2007/0112872 | A1 | 5/2007 | Saito |
| 2008/0310320 | A1* | 12/2008 | Kim .................... H04L 41/5022 370/252 |
| 2010/0216467 | A1* | 8/2010 | Ryan .................... H04W 24/04 455/435.1 |
| 2011/0090820 | A1 | 4/2011 | Hussein et al. |
| 2011/0231532 | A1* | 9/2011 | Nishimura .......... H04L 41/0672 709/221 |
| 2012/0016972 | A1* | 1/2012 | Tamura ............... H04L 41/0213 709/220 |
| 2012/0131376 | A1* | 5/2012 | Khawer ................ H04W 24/04 714/4.11 |
| 2012/0213057 | A1* | 8/2012 | Zhang .................... H04W 24/02 370/216 |
| 2012/0244868 | A1* | 9/2012 | Liu ........................ H04W 24/02 455/446 |
| 2013/0089075 | A1* | 4/2013 | Lim ...................... H04W 36/04 370/331 |
| 2013/0191714 | A1* | 7/2013 | Rothschiller ......... G06F 17/243 715/226 |
| 2013/0324076 | A1* | 12/2013 | Harrang ................ H04W 28/08 455/405 |
| 2014/0045544 | A1* | 2/2014 | Ohyama ............. H04W 52/146 455/522 |
| 2015/0078344 | A1* | 3/2015 | Futaki .................. H04W 24/02 370/332 |

FOREIGN PATENT DOCUMENTS

| | | |
|---|---|---|
| WO | WO 2008-042414 A2 | 4/2008 |
| WO | WO 2013-063943 A1 | 5/2013 |

OTHER PUBLICATIONS

Extended European Search Report for European Patent Application No. 14852611.4 dated Mar. 29, 2017.

* cited by examiner

UNDOING CHANGES MADE TO A COMMUNICATION NETWORK

CROSS-REFERENCES TO RELATED APPLICATIONS

This application claims priority to U.S. Provisional Application No. 61/889,138, filed on Oct. 10, 2013, entitled SON Parameter Rollback, which is hereby incorporated by reference in its entirety.

BACKGROUND

Wireless networks rely on a large number of individual base stations to provide high capacity wireless services over large coverage areas such as market areas (e.g., cities), surrounding residential areas (e.g., suburbs, counties), highway corridors and rural areas. Continuous radio connectivity across these large coverage areas is accomplished via user mobility from one base station to others as the user traverses the network's operating area. High reliability mobility in mobile wireless networks minimizes the number of dropped calls or other abnormal discontinuations of radio service to the supported users.

Self-Organizing or Self-Optimizing Network (SON) technology provides automated processes that support the configuration and optimization of communication networks. For example, SON optimization processes may continuously run on a network in order to continuously monitor and/or optimize the performance of the network and the network elements or managed objects (e.g., base stations, cells, and so on) in the network. SON processes may be limited in their reach in a network, where some SON processes only run for certain network elements (e.g., elements within a suburb), while other SON processes run for other network elements (e.g., elements along a highway corridor). In some cases, such modifications to a communication network may cause unintended or unwanted problems or configurations.

SUMMARY

Systems and methods for undoing changes or modifications made to a communication network are described. In some embodiments, the systems and methods access a request to rollback one or more changes made to parameters of managed objects associated with a communication network within a given time period, retrieve information identifying the one or more changes made to the parameters of the managed objects within the given time period, and, for each managed object, determine a cumulative changetype (e.g., add, deleted, or update) associated with the one or more changes made to the parameters of the managed object and perform an action to apply the determined cumulative changetype to the managed object.

In some embodiments, the systems and methods provide a rollback system that includes a rollback request module that accesses a request to rollback one or more changes made to parameters of managed objects associated with a communication network within a given time period, a changes retrieval module that retrieves information identifying the one or more changes made to the parameters of the managed objects within the given time period, a changes determination module that, for each managed object, determines a cumulative changetype associated with the one or more changes made to the parameters of the managed object, and, a rollback action module that, for each managed object, performs an action to apply the determined cumulative changetype to the managed object.

In some embodiments, the systems and methods access or receive a request to rollback one or more changes made to cells associated with a communication network within a given time period, retrieve information identifying the one or more changes made to the cells within the given time period, and, for each cell, determine a cumulative changetype associated with the one or more changes made to the cell, and roll back the changes made to the cell by applying a rollback changetype action to the cell that is associated with the determined cumulative changetype associated with the one or more changes made to the cell.

DETAILED DESCRIPTION

Figure 1:
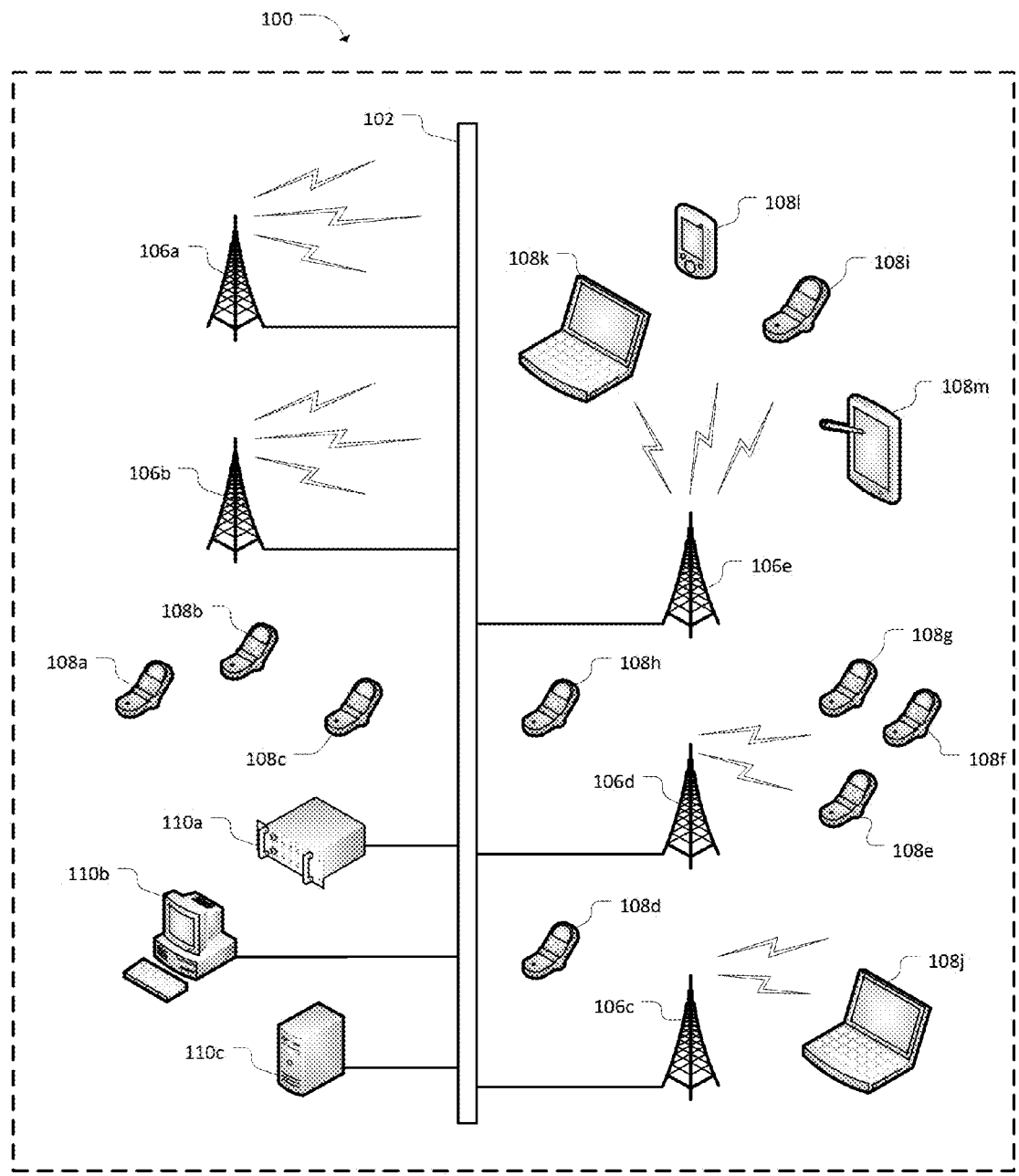
FIG. 1 is a block diagram illustrating a suitable network environment.

Systems and methods for undoing changes, modifications, additions, deletions, updates, and so on, made to or performed on a communication network (e.g., during running SON processes) and/or managed objects (e.g., cells) associated with the communication are described. For example, the systems and methods may undo changes made to cells of a network by accessing or receiving a request to rollback one or more changes made to cells associated with a communication network within a given time period, retrieving information from a differential service identifying the one or more changes made to the cells within the given time period, and, for each cell, determining a cumulative changetype associated with the one or more changes made to the cell, and rolling back the changes made to the cell by applying a rollback changetype action to the cell that is associated with the determined cumulative changetype associated with the one or more changes made to the cell.

As described herein, SON processes (e.g., automated scripts running on a network) directly apply network optimization to communication network parameters and objects, in order to optimize the performance and configuration of the communication network. However, at times, changes applied by a SON script may negatively impact the performance of the communication network. The rollback system and methods described herein enables network providers and/or administrators to undo the undesired or ineffective changes made to the communication network without affecting the beneficial or effective changes made to the communication network, among other benefits.

In the following detailed description, reference is made to the accompanying drawings, which form a part of the description. The embodiments described in the detailed description, drawings, and claims are not meant to be limiting. Other embodiments may be utilized, and other changes may be made, without departing from the spirit or scope of the subject matter presented herein. It will be understood that the aspects of the present disclosure, as generally described herein and illustrated in the drawings, may be arranged, substituted, combined, separated, and designed in a wide variety of different configurations.

The technology can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term processor refers to one or more devices, circuits, and/or processing cores configured to process data, such as computer program instructions.

A detailed description of embodiments is provided below along with accompanying figures that illustrate the principles of the technology. The technology is described in connection with such embodiments, but the technology should not be limited to any embodiment. The scope of the technology is limited only by the claims and the technology encompasses numerous alternatives, modifications and equivalents. Numerous specific details are set forth in the following description in order to provide a thorough understanding of the technology. These details are provided for the purpose of illustration and the technology may be practiced according to the claims without some or all of these specific details. For the purpose of clarity, technical material that is known in the technical fields related to the technology has not been described in detail so that the technology is not unnecessarily obscured.

Examples of the Network Environment

FIG. 1 illustrates an example network environment 100 which may include a rollback system configured to undo changes made to the network environment 100 and/or managed objects associated with the network environment 100. Any of the machines, databases, or devices shown in FIG. 1 and other Figures described herein may be implemented in a general-purpose computer modified (e.g., configured or programmed) by software to be a special-purpose computer to perform the functions described herein for that machine, database, or device. Moreover, any two or more of the machines, databases, or devices illustrated in FIG. 1 may be combined into a single machine, and the functions described herein for any single machine, database, or device may be subdivided among multiple machines, databases, or devices.

As depicted, the network environment 100 includes a data communications network 102, one or more base stations 106a-e, one or more network resource controllers 110a-c, and one or more User Equipment (UE) 108a-m, such as mobile or other computing devices. As used herein, the term "base station" refers to a wireless communications station provided in a location that serves as a hub of a wireless network. The base stations may be used with macrocells, microcells, picocells, and femtocells.

The data communications network 102 may include a backhaul portion that can facilitate distributed network communications between any of the network controller devices 110 a-c and any of the base stations 106a-e. Any of the network controller devices 110a-c may be a dedicated Network Resource Controller (NRC) that is provided remotely from the base stations or provided at the base station, and may include a rollback system and/or components of a rollback system. Any of the network controller devices 110a-c may be a non-dedicated device that provides NRC functionality among others. The one or more UE 108a-m may include cell phone devices 108a-i, laptop computers 108j-k, handheld gaming units 108l, electronic book devices or tablet PCs 108m, and any other type of common portable wireless computing device that may be provided with wireless communications service by any of the base stations 106a-e.

The backhaul portion of a data communications network 102 may include intermediate links between a backbone of the network, which are generally wire line, and sub networks or base stations 106a-e located at the periphery of the network. For example, cellular user equipment (e.g., any of UE 108a-m) communicating with one or more base stations 106a-e may constitute a local sub network. The network connection between any of the base stations 106a-e and the rest of the world may initiate with a link to the backhaul portion of an access provider's communications network 102 (e.g., via a point of presence).

In some embodiments, the NRC has presence and functionality that may be defined by the processes it is capable of carrying out. Accordingly, the conceptual entity that is the NRC may be generally defined by its role in performing processes associated with embodiments of the present disclosure. Therefore, the NRC entity may be considered to be either a hardware component and/or a software component that is stored in computer readable media such as volatile or non-volatile memories of one or more communicating device(s) within the networked computing system 100.

In some embodiments, any of the network controller devices 110a-c and/or base stations 106a-e may function independently or collaboratively to implement processes associated with various embodiments of the present disclosure described herein. Further, processes for dynamically optimizing network elements of a network, such as newly added network element, may be carried out via various communication protocols, such as those associated with modern Global Systems for Mobile (GSM), Universal Mobile Telecommunications System (UMTS), Long Term Evolution (LTE) network infrastructures, and so on.

In accordance with a standard GSM network, any of the network controller devices 110a-c (NRC devices or other devices optionally having NRC functionality) may be associated with a base station controller (BSC), a mobile switching center (MSC), or any other common service provider control device known in the art, such as a radio resource manager (RRM). In accordance with a standard UMTS network, any of the network controller devices 110a-c (optionally having NRC functionality) may be associated with a NRC, a serving GPRS support node (SGSN), or any other common network controller device known in the art, such as an RRM. In accordance with a standard LTE network, any of the network controller devices 110a-c (optionally having NRC functionality) may be associated with an eNodeB base station, a mobility management entity (MME), or any other common network controller device known in the art, such as an RRM.

In some embodiments, any of the network controller devices 110a-c, the base stations 106a-e, as well as any of the UE 108a-m may be configured to run various operating systems, such as Microsoft® Windows®, Mac OS®, Google® Chrome®, Linux®, Unix®, or any mobile operating system, including Symbian®, Palm®, Windows Mobile®, Google® Android®, Mobile Linux®, and so on. Any of the network controller devices 110a-c, or any of the base stations 106a-e may employ any number of common server, desktop, laptop, and personal computing devices.

In some embodiments, any of the UE 108a-m may be associated with any combination of common mobile computing devices (e.g., laptop computers, tablet computers, cellular phones, handheld gaming units, electronic book devices, personal music players, MiFi™ devices, video recorders, and so on), having wireless communications capabilities employing any common wireless data communications technology, including, but not limited to: GSM, UMTS, 3GPP LTE, LTE Advanced, WiMAX, and so on.

In some embodiments, the backhaul portion of the data communications network 102 of FIG. 1 may employ any of the following common communications technologies: optical fiber, coaxial cable, twisted pair cable, Ethernet cable, and power-line cable, along with any other wireless communication technology known in the art. In context with various embodiments described herein, it should be understood that wireless communications coverage associated with various data communication technologies (e.g., base stations 106a-e) typically vary between different service provider networks based on the type of network and the system infrastructure deployed within a particular region of a network (e.g., differences between GSM, UMTS, LTE, LTE Advanced, and WiMAX based networks and the technologies deployed in each network type).

Figure 2:
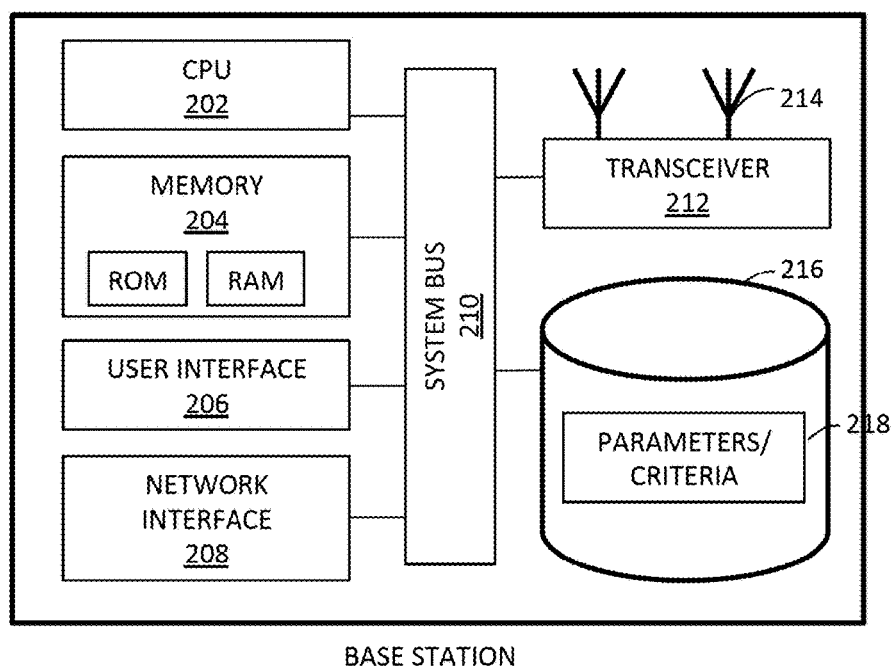
FIG. 2 is a block diagram illustrating a network resource controller.

FIG. 2 illustrates a block diagram of a base station 200 (e.g., a cell, femtocell, picocell, microcell or macrocell) that may be representative of the base stations 106a-e in FIG. 1. In some embodiments, the base station 200 includes at least one central processing unit (CPU) 202. The CPU 202 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 202 is responsible for executing computer programs stored on volatile (RAM) and nonvolatile (ROM) system memories 204.

The base station 200 may include a user interface 206 for inputting and retrieving data to and from the base station by operator personnel, and a network interface 208 coupled to a wireline portion of the network. Meanwhile, the base station 200 wirelessly sends and receives information to and from UE through a transceiver 212, which is equipped with one or more antenna 214.

The base station 200 may further include a system bus 210 and data storage 216. The system bus facilitates communication between the various components of the base station 200. For example, the system bus 210 may facilitate communication between a program stored in data storage 216 and the CPU 202, which executes the program. In some embodiments, data storage 216 may store parameters 218 for the base station 200, such as parameters identifying the geographical or network location of the base station 200, parameters identifying one or more carrier frequencies or operating bands via which the base station 200 operates, parameters identifying hierarchical relationships within the network between the base station 200 and other base stations (e.g., between the base station and neighboring cells), parameters associated with load-balancing or other performance metrics, parameters associated with a position, tilt, and/or geometry of an antenna, and so on. In addition, data storage 216 may include an operating system, and various programs related to the operation of the base station 200.

As an example, in Radio Access Network Operational Support Systems (RAN OSSs), configuration data is typically stored in Managed Objects (MOs). Each MO can be retrieved when its Distinguished Name (DN) is known. MOs are often associated with physical or logical entities within the network. For example, a UtranCell MO may be associated with a logical UMTS cell, such as a UMTS base station. Each MO may have or be associated with multiple configurable parameters (e.g., a UtranCell MO may have associated parameters such as transmit power, handover offsets, or other described herein.).

At various times, changes are made to the MOs and/or parameters associated with the MOs. For example, some changes that may be applied to MOs and/or MO parameters include "update" type changes, where or more configurable parameters in the MO are changed, "add" type changes, where a new MO is added to the network, "delete" type changes, where an MO is deleted from the network, and so on.

In various embodiments, the base station 200 may use any modulation/encoding scheme known in the art such as Binary Phase Shift Keying (BPSK, having 1 bit/symbol), Quadrature Phase Shift Keying (QPSK, having 2 bits/symbol), and Quadrature Amplitude Modulation (e.g., 16-QAM, 64-QAM, etc., having 4 bits/symbol, 6 bits/symbol, and so on) to send and receive information to and from UE through the transceiver 212. Additionally, the base station 200 may be configured to communicate with UEs 108a-m via any Cellular Data Communications Protocol, including any common GSM, UMTS, WiMAX or LTE protocol.

Figure 3:
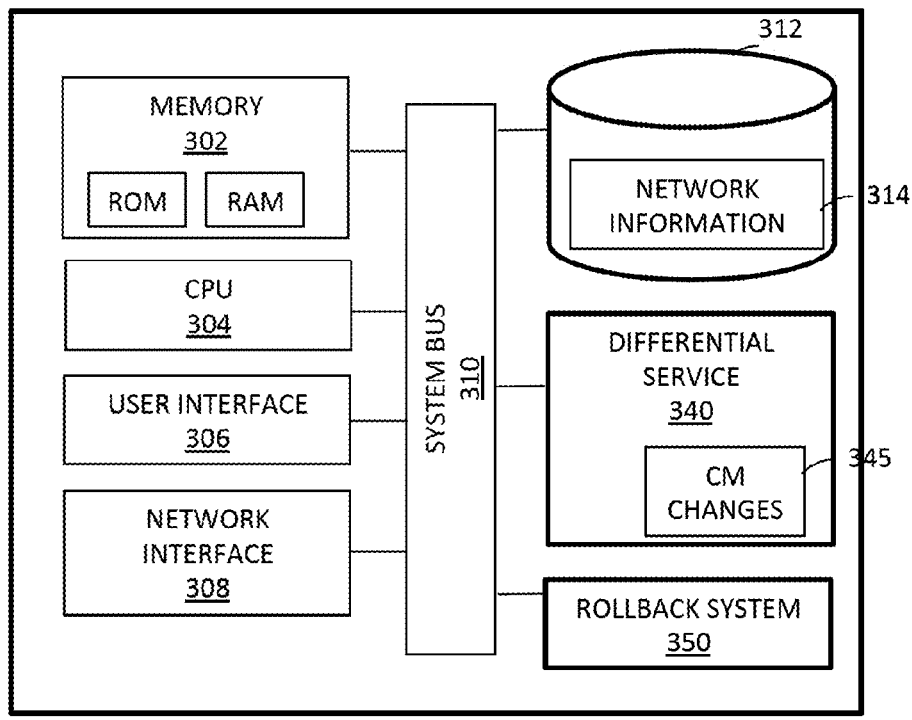
FIG. 3 is a block diagram illustrating a base station or cell.

FIG. 3 illustrates a block diagram of an NRC 300 that may be representative of any of the network controller devices 110a-c. In some embodiments, one or more of the network controller devices 110a-c are self-optimizing or self-organizing network (SON) controllers. The NRC 300 includes one or more processor devices including a central processing unit (CPU) 304. The CPU 304 may include an arithmetic logic unit (ALU) (not shown) that performs arithmetic and logical operations and one or more control units (CUs) (not shown) that extracts instructions and stored content from memory and then executes and/or processes them, calling on the ALU when necessary during program execution.

The NRC 300 may also include a user interface 306 that allows an administrator to interact with the NRC's software and hardware resources and to display the performance and operation of the networked computing system 100. In addition, the NRC 300 may include a network interface 308 for communicating with other components in the networked computer system, and a system bus 310 that facilitates data communications between the hardware resources of the NRC 300.

In addition to the network controller devices 110a-c, the NRC 300 may be used to implement other types of computer devices, such as an antenna controller, an RF planning engine, a core network element, a database system, and so on. Based on the functionality provided by an NRC, the storage device of such a computer serves as a repository for software and database thereto.

The CPU 304 is responsible for executing computer programs stored on volatile (RAM) and nonvolatile (ROM) memories 302 and a storage device 312 (e.g., HDD or SSD). In some embodiments, the storage device 312 may store program instructions as logic hardware such as an ASIC or FPGA. The storage device 312 may include network information 314 or running processes (e.g., stored network optimization processes, element lists, policies such as automation process policies associated with rules or algorithms that control, manage, and/or monitor the self-optimization and/or self-organization of the network and network elements), and so on.

SON optimization processes may perform various functions when optimizing the performance and/or configuration of the network 102. For example, SON processes may include self-configuration of base stations (e.g., configuration of emission power and/or antenna tilt) in response to changes to a network, self-optimization of configuration parameters of the base stations, cells, and other network elements (e.g., automatic neighbor relationship (ANR) parameter optimization, random access parameter optimization, handover parameter optimization, self-healing of network elements (e.g., adjusting parameters within functioning base stations to compensate for non- or poor-functioning base stations), and so on.

In some embodiments, the NRC 300 includes a differential service 340 that includes components configured to monitor, track, and/or store information identifying changes or modifications made to the network environment 100, such as changes (e.g., CM changes 345) made to the network 102 and/or managed objects (e.g., base stations 106*a-e*) associated with the network 102.

For example, the differential service 340 may maintain a record 345 of all Configuration Management (CM) parameter changes. The differential service 340 updates its records every time new CM data is read from the network (e.g., from the RAN OSS's or from periodic exports of the CM Data to files). The differential service 340, therefore, may detect all changes made to all parameters in the network, and not only changes made by a SON system or processes. Thus, the differential service 340 may track any change made to the network, which may be viewed and rolled back by the rollback system 350.

For rollback purposes, the differential service 340 may be extended to include Application Programming Interfaces (APIs) that support rollback functionality, including a "DiffCell" API that provides a summary of changes for all managed object types, and a "DiffCellChanges" API that returns more detailed changes for any object type.

In some embodiments, the NRC includes a rollback system 350 configured to undo changes made to some or all aspects or objects of the network environment 100. For example, the rollback system 350 may communicate with the differential service 340 (e.g., by calling one or more APIs) to access or receive information (e.g., object identifier and changes performed on the object) that identifies changes made to the network environment 100 within a given time period (e.g., since a previous time), such as changes made during the running of SON processes. The rollback system 350, therefore, may roll back some or all of the MOs associated with the network 102 to a configuration that existed at a point in the past, such as a configuration associated with a desired or optimal performance.

Examples of Undoing Changes Made to a Communication Network

As described herein, in some embodiments, the rollback system 350 includes components configured to undo changes made to a communication network, such as the network 102 within the network environment 100 and/or changes made to parameters of managed objects associated with a communication network, such as the base stations or cells 106*a-e* within the network environment 100.

Figure 4:
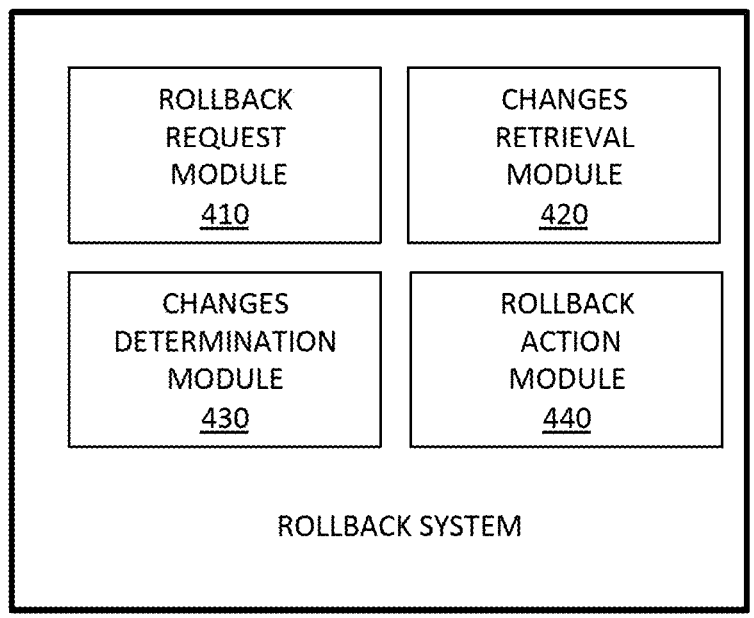
FIG. 4 is a block diagram illustrating the components of a rollback system configured to undo changes made to a communication network.

FIG. 4 is a block diagram illustrating the components of the rollback system 350, which is configured to undo changes made to a communication network. The rollback system 350 may include one or more modules and/or components to perform one or more operations of the rollback system 350. The modules may be hardware, software, or a combination of hardware and software, and may be executed by one or more processors. For example, the rollback system 350 may include a rollback request module 410, a changes retrieval module 420, a changes determination module 430, and a rollback action module 440.

In some embodiments, the rollback request module 410 is configured and/or programmed to access or receive a request to rollback one or more changes made to parameters of managed objects associated with a communication network within a given time period. For example, the rollback request module 410 may receive a request from a network administrator or a network performance monitoring element to undo changes made within a given time period that may have caused an undesired performance of one or more managed objects associated with the network. The time period may be, for example, a period of time when certain SON processes optimized the network, a period of time from a current time to a last known previous time associated with a desired or optimal performance of the network and/or some or all associated managed objects, and so on.

In some embodiments, the changes retrieval module 420 is configured and/or programmed to retrieve information identifying the one or more changes made to the parameters of the managed objects within the given time period. For example, the changes retrieval module 420 may retrieve the information identifying the one or more changes made to the parameters of the managed objects by calling an application programming interface of the differential service 340 provided by the communication network that maintains the record of changes 345 made to parameters of managed objects associated with the communication network. The changes retrieval module 420 may retrieve information that identifies changes made to the parameters of the managed objects during a self-optimization or other SON processes running on the communication network.

In some embodiments, the changes determination module 430 is configured and/or programmed to determine cumulative changetypes associated with the one or more changes made to the parameters of the managed objects. For example, the changes determination module 430 determines a cumulative changetype associated with the one or more changes made to the parameters of a managed object by merging all changes made to the managed object within the given time period.

For example, the changes determination module 430 may determine the changetype and associated parameters values for various managed objects (having corresponding DNs) that have changed or been modified after a certain or given time period (e.g., after a rollback time). Using the determined cumulative changetype, the changes determination module 430 may determine a rollback changetype, to be applied to the MOs in order to roll back the MOs to the previous configuration or state.

The following table provides rules that illustrate the relationships between cumulative changes made to MOs, cumulative changetypes determined from the changes, parameters affected by the changes, and rollback changetypes associated with the cumulative changetypes:

| Change type | Cumulative Change Type | Parameters | Rollback ChangeType |
|---|---|---|---|
| Add | Add | Add params | Delete |
| Update | Update | Update params old value | Update |
| Delete | Delete | Delete params value | Add |
| (Add, Update) | Add | Add params | Delete |
| (Update, Delete) | Delete | All Update params old value and delete params value. Keep oldest value for a parameter if it's been changed multiple times. | Add |
| (Update, Update) | Update | All update params old value. If there is a delete & add in the middle, then include delete params value. Keep oldest value for a parameter. | Update |
| (Delete, Add) | Update | Delete params value (which indicates the earlier stage) | Update |
| (Add, Delete) | None | None | None (No action) |
| (Update, Add) | Update | All update params old value and delete params value. Keep oldest value for a parameter. | Update |
| (Add, Add) | Add | First Add params | Delete |
| (Delete, Delete) | Delete | First Delete params | Add |
| (Delete, Update) | Update | Delete params | Update |

As an example, when a cell is associated with change types of "added," "updated," and "deleted," after a given rollback time, the cumulative changetype is determined (using the Table) as (added, deleted)=None, and parameters are =None. Therefore, the rollback changetype is determined as None, and the rollback system will not perform an action of the cell.

As another example, when a cell is associated with change types of "updated," "updated," "deleted, "added," and "updated," after a given rollback time, the cumulative changetype is determined (using the Table) as (updated, updated)=updated, and cumulative parameters are (updated, deleted). Therefore, the rollback changetype is determined as updated, and the rollback system will update the parameters accordingly.

In some embodiments, the rollback action module 440 is configured and/or programmed to perform an action to apply the determined cumulative changetypes to the managed objects. For example, the rollback action module 440 may apply, or cause to apply, the determined cumulative changetype to the managed objects in order to roll back the parameters of the managed objects to a state before commencement of the given time period. The rollback system 350 may push the changes to a management system or other systems configured to set parameters associated with managed objects, among other things.

Figure 5:
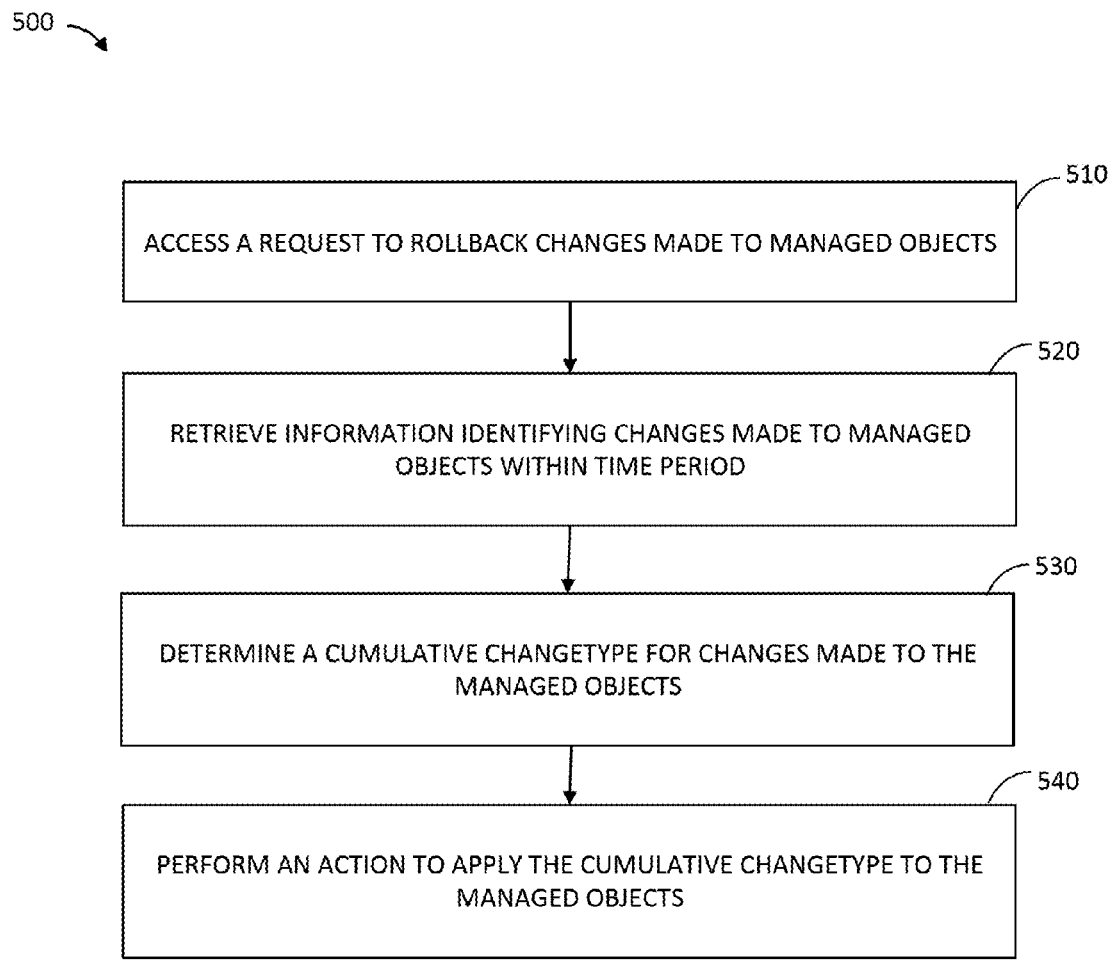
FIG. 5 is a flow diagram illustrating a method for undoing changes made to managed objects of a communication network.

As described herein, the rollback system 350 may perform various algorithms, routines, and/or methods when undoing changes made to a communication network. FIG. 5 is a flow diagram illustrating a method 500 for undoing changes made to managed objects of a communication network. The method 500 may be performed by the rollback system 350 and, accordingly, is described herein merely by way of reference thereto. It will be appreciated that the method 500 may be performed on any suitable hardware.

In operation 510, the rollback system 350 accesses or receives a request to rollback one or more changes made to parameters of managed objects associated with a communication network within a given time period. For example, the rollback request module 410 may receive a request from a network administrator or a network performance monitoring element to undo changes made within a given time period that may have caused an undesired performance of one or more managed objects associated with the network.

As described herein, example changes made to managed objects may include updates made to parameters of the managed objects, the addition of one or more managed objects to communication network, and/or the deletion of one or more managed objects associated to the communication network.

In operation 520, the rollback system 350 retrieves information identifying the one or more changes made to the parameters of the managed objects within the given time period. For example, the changes retrieval module 420 may retrieve the information identifying the one or more changes made to the parameters of the managed objects by calling an application programming interface of the differential service 340 provided by the communication network that maintains the record of changes 345 made to parameters of managed objects associated with the communication network.

In operation 530, the rollback system 350 determines, for each managed object, a cumulative changetype associated with the one or more changes made to the parameters of the managed object. For example, the changes determination module 430 determines a cumulative changetype associated with the one or more changes made to the parameters of a managed object by merging all changes made to the managed object within the given time period.

In operation 540, the rollback system performs, for each managed object, an action to apply the determined cumulative changetype to the managed object. For example, the rollback action module 440 may apply, or cause to apply, the determined cumulative changetype to the managed objects in order to roll back the parameters of the managed objects to a state before commencement of the given time period (e.g., since the last known optimal performance of the network or managed objects).

The rollback system 350 may perform a variety of different actions based on the determined cumulative changetypes in order to roll back a network and/or managed objects to a previous or optimal state, including:

when the changes determination module 430 determines a changetype associated with a cumulative addition of parameters to the managed object, the rollback action module 440 causes an element management system to delete the cumulative addition of parameters from the managed object;

when the changes determination module 430 determines a changetype associated with a cumulative deletion of parameters to the managed object, the rollback action module 440 causes an element management system to add the cumulative deletion of parameters to the managed object;

when the changes determination module 430 determines a changetype associated with a cumulative update to the parameters to the managed object from a first state to a second state, the rollback action module 440 causes an element management system to update the parameters to the managed object to the first state;

when the changes determination module 430 determines a changetype associated with an addition of a managed object to the network, the rollback action module 440 causes an element management system to delete the managed object from the network;

and/or when the changes determination module 430 determines a changetype associated with a deletion of a managed object from the network, the rollback action module 440 causes an element management system to add the managed object to the network.

Figure 6:
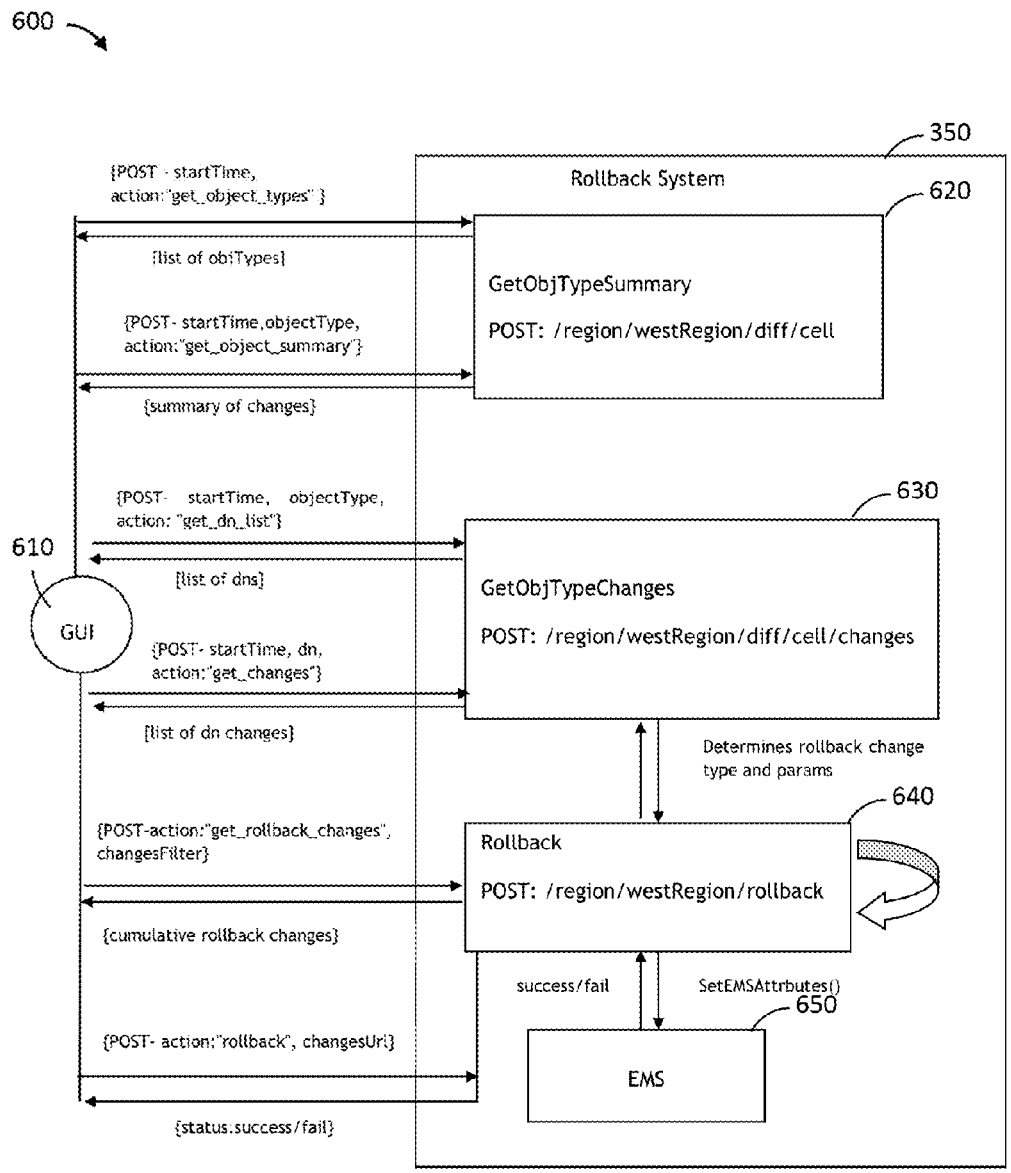
FIG. 6 is a data flow diagram illustrating the flow of data between a rollback system configured to undo changes made to a communication network and a differential service configured to track and store the changes made to the communication network.

As described herein, in some embodiments, the rollback system 350 may communicate with the differential service 340 in order to access, retrieve, identify, and/or receive information associated with changes made within the network environment 100 within a given time period. FIG. 6 is a data flow diagram 600 illustrating the flow of data between a rollback system configured to undo changes made to a communication network and a differential service configured to track and store the changes made to the communication network.

As depicted, a graphical user interface (GUI) 610, or other communication interface, of the differential service 340, initiates a rollback process by specifying a date and/or time to the rollback system 350. The rollback system 350 returns a list of modified object types 620. In response, the GUI 610 requests a summary of changes for the object types within the list. The differential service 340 replies with a count of the distinct MOs that have been modified. The GUI 610 may also send a request to the rollback system 350 to obtain a list of DNs associated with the modified MOs. When the list of DNs is large, the differential service 340 replies with a smaller list or subset of DNs that may be paged through next and previous URLs.

To get the details of changes for each of the MOs, the GUI 610 requests a particular DN to specify a date and time (e.g., a datetime). The differential service 340 replies with all changes that happened after that date and time for that particular DN, and sends information 630 that identifies the changes to the rollback system 350. The GUI 610 requests the rollback system 350 to perform rollback for the selected changes. The rollback system 350 determines the rollback changetype and parameters to be set, in order to complete rollback 640, and sends information to the GUI 610 identifying the cumulative rollback changes. The GUI 610 confirms the changes, and pushes the changes to an Element Management Service (EMS) 650, via the rollback system 350. The rollback system 350 returns a success or fail message based on a result of the roll back action.

Thus, in some embodiments, the systems and methods describe herein provide a differential service 340 and rollback system 350 to roll back or otherwise undo changes made to a network (e.g., to managed objects), by accessing a request to rollback one or more changes made to cells associated with a communication network within a given time period, retrieving information identifying the one or more changes made to the cells within the given time period, determining cumulative changetypes associated with the one or more changes made to the cells, and rolling back the changes made to the cell by applying a rollback changetype action to the cells, the rollback changetypes associated with the determined cumulative changetypes associated with the one or more changes made to the cells.

Example Rollback Scenarios

The following rollback scenarios depict examples of rolling back changes managed objects within the network environment 100

Scenario 1—A FSC cell 'VSTR5LVL1' was changed by a SON module on August 1st.

Before changing the cell has the following properties:

```
{
"AdjgTxPwrMaxTCH": "0",
"AdjgBCC": "7",
"RtHopgIdentifier": "2",
msTxPwrMaxGSM1x00": "20",
}
```

On August 2nd, the following updates were made on the cell:
changeType: "updated"
changes:

```
{
"AdjgTxPwrMaxTCH": 30"],
"AdjgBCC": "10",
"RtHopgIdentifier": "3"
}
```

The changes were stored in the CN record 345 of the differential service 340, as follows:
changeType: "updated"
changes:

```
{
DN for 'VSTR5LVL1':
{
"AdjgTxPwrMaxTCH": ["0", "30"],
"AdjgBCC": ["7", "10"],
"RtHopgIdentifier": ["2", "3"]
}
}
``` where each pair of value indicates old value and the new value.

On August 5th, further changes were applied to the same cell.
changeType: "updated"
changes:

```
{
"RtHopgIdentifier":"4",
"msTxPwrMaxGSM1x00": "20"
}
```

A week later, it was determined that the changes did not improve that cell and instead downgraded the performance, and the cell should be returned to its state as of August 1st. A request is sent to the rollback system 350, the request including the date August 1st and the cell DN for 'VSTR5LVL1'. The rollback system 350, using the methods described herein, determines the cumulative changes to be restored after that date and replies with the following changes:
rollback changeType: "updated"
rollback changes:

```
{
DN for 'VSTR5LVL1':
{
"AdjgTxPwrMaxTCH": "0",
"AdjgBCC": "7",
"RtHopgIdentifier": "2",
msTxPwrMaxGSM1x00": "20",
}
}
```

The changes are confirmed and pushed to the EMS via rollback system 350, and rollback to the previous state of the cell is complete.

Scenario 2—Another FSC cell 'VSTR5LVL1' was added by a SON module on August 2nd.
The cell was added with the following properties:

```
{
  "AdjgTxPwrMaxTCH": "0"
  "AdjgBCC": "7",
  "RtHopgIdentifier": "2",
}
```

The changes were stored in the CN record 345 of the differential service 340, as follows:
changeType: "added"
changes:

```
{
DN for 'VSTR5LVL1':
  {
    "AdjgTxPwrMaxTCH": "30",
    "AdjgBCC": "7",
    "RtHopgIdentifier": "2",
  }
}
```

The changes are to be undone the next day, and a request including the cell DN and the date August $1^{st}$ is sent to the rollback system 350. The rollback system 350, using the methods described herein, determines the cumulative changeType for the cell, and replies with the following changes:
rollback changeType: "deleted"
rollback changes:

```
{
DN for 'VSTR5LVL1':
  {
    "AdjgTxPwrMaxTCH": "30",
    "AdjgBCC": "7",
    "RtHopgIdentifier": "2",
  }
}
```

The changes are confirmed and pushed to the EMS via rollback system 350, and rollback to the previous state is complete.

Scenario 3—A FSC cell 'VSTR5LVL1' was deleted by a SON module on August 2nd.
When the cell was deleted, it had the following properties:

```
{
  "AdjgTxPwrMaxTCH": "0",
  "AdjgBCC": "7",
  "RtHopgIdentifier": "2",
}
```

The changes were stored in the CN record 345 of the differential service 340, as follows:
changeType: "deleted"
changes:

```
DN for 'VSTR5LVLT':
  {
    "AdjgTxPwrMaxTCH": "30",
    "AdjgBCC": "7",
    "RtHopgIdentifier": "2",
  }
}
```

The changes are to be undone the next day, and a request including the cell DN and the date August $1^{st}$ is sent to the rollback system 350. The rollback system 350, using the methods described herein, determines the cumulative changeType for the cell, and replies with the following changes:
rollback changeType: "deleted"
rollback changes:

```
{
DN for 'VSTR5LVL1':
  {
    "AdjgTxPwrMaxTCH": "30",
    "AdjgBCC": "7",
    "RtHopgIdentifier": "2",
  }
}
```

The changes are confirmed and pushed to the EMS via rollback system 350, and rollback to the previous state is complete.

Of course, other scenarios are possible and supported by the rollback system 350 described herein.

Although aspects of the present technology have been described with respect to specific examples, embodiments of the present technology are not limited by these examples. For example, persons of skill in the art will recognize that pre-delivering content to user devices may be performed according to various other algorithms and processes without departing from the scope or spirit of the present technology.

What is claimed is:

1. A method performed by at least one processor of a network resource controller coupled to an element management system that manages a base station of a cellular communications network, the method comprising:
   accessing a request to rollback a plurality of changes made to parameters of a cell of the base station within a given time period;
   retrieving information identifying the plurality of changes made to the parameters of the cell within the given time period;
   determining a cumulative changetype associated with the plurality of changes made to the parameters of the cell; and
   performing an action to apply the determined cumulative changetype to the cell,
   wherein when changes made to the cell within the given time period include adding the cell followed by updating one or more parameter of the cell, the cumulative changetype is adding the cell, and the action is causing the element management system to delete the cell,
   wherein retrieving information identifying the plurality of changes made to the parameters of the cell within the given time period includes calling an application programming interface of a differential service provided by the cellular communication network that maintains a record of changes made to parameters of managed objects associated with the cellular communication network.

2. The method of claim 1, wherein performing an action to apply the determined cumulative changetype to the cell includes applying the determined cumulative changetype to roll back the parameters of the cell to a state before commencement of the given time period.

3. The method of claim 1, wherein retrieving information identifying the one or more changes made to the parameters of the cell within the given time period includes retrieving information identifying the one or more changes made to the parameters of the cell during a self-optimization of the communication network.

4. The method of claim 1, wherein the plurality of changes made to parameters of the cell includes updates made to parameters of the cell.

5. The method of claim 1, wherein determining the cumulative changetype associated with the plurality of changes made to the parameters of the cell includes merging all changes made to the cell within the given time period.

6. The method of claim 1, wherein determining a cumulative changetype associated with the plurality of changes made to the parameters of the cell includes determining a changetype associated with a cumulative addition of parameters to the cell; and wherein performing an action to apply the determined cumulative changetype to the cell includes causing the element management system to delete the cumulative addition of parameters from the cell.

7. The method of claim 1, wherein determining a cumulative changetype associated with the plurality of changes made to the parameters of the cell includes determining a changetype associated with a cumulative deletion of parameters from the cell; and wherein performing an action to apply the determined cumulative changetype to the cell includes causing the element management system to add the cumulative deletion of parameters to the cell.

8. The method of claim 1, wherein determining a cumulative changetype associated with the plurality of changes made to the parameters of the cell includes determining a changetype associated with a cumulative update of the parameters of the cell from a first state to a second state; and wherein performing an action to apply the determined cumulative changetype to the cell includes causing the element management system to update the parameters of the cell to the first state.

9. The method of claim 1, wherein determining a cumulative changetype associated with the one or more changes made to the parameters of the second cell includes determining a changetype associated with a deletion of the second cell;

and wherein performing an action to apply the determined cumulative changetype to the second cell includes causing the element management system to add the second cell.

10. A system, comprising:
a network resource controller coupled to an element management system that manages a base station of a cellular communications network, the network resource controller having a non-transitory computer readable medium which, when executed by at least one processor of the network resource controller, performs the following method:
accessing a request to rollback a plurality of changes made to parameters of a cell of one of the plurality of base stations within a given time period;
retrieving information identifying the plurality of changes made to the parameters of the cell within the given time period;
determining a cumulative changetype associated with the plurality of changes made to the parameters of the cell; and
performing an action to apply the determined cumulative changetype to the cell,
wherein when changes made to the cell within the given time period include adding the cell followed by updating one or more parameter of the cell, the cumulative changetype is adding the cell, and the action is causing the element management system to delete the cell,
wherein the processor retrieves the information identifying the one or more changes made to the parameters of the cell by calling an application programming interface of a differential service provided by the communications network that maintains a record of changes made to parameters of managed objects associated with the communication network.

11. The method of claim 10, wherein the processor applies the determined cumulative changetype to roll back the parameters of the cell to a state before commencement of the given time period.

12. The system of claim 10, wherein the processor retrieves information identifying the one or more changes made to the parameters of the cell during a self-optimization of the communication network.

13. The system of claim 10, wherein the processor determines a cumulative changetype associated with the one or more changes made to the parameters of a managed object by merging all changes made to the managed object within the given time period.

14. A non-transitory computer-readable storage medium whose contents, when executed by a computing system coupled to an element management system that manages a base station of a cellular communications network, cause the computing system to perform operations, the operations comprising:
accessing a request to rollback a plurality of changes made to parameters of a cell of the base station within a given time period;
retrieving information identifying the plurality of changes made to the parameters of the cell within the given time period;
determining a cumulative changetype associated with the plurality of changes made to the parameters of the cell; and
performing an action to apply the determined cumulative changetype to the cell,
wherein when changes made to the cell within the given time period include adding the cell followed by updating one or more parameter of the cell, the cumulative changetype is adding the cell, and the action is causing the element management system to delete the cell,
wherein retrieving information identifying the plurality of changes made to the cell within the given time period includes calling an application programming interface of a differential service provided by the communication network that maintains a record of changes made to cells associated with the communication network during self-optimization processes performed with the given time period.

15. The method of claim 1,
wherein when changes made to the cell within the given time period include updating the cell parameters followed by deleting the cell, the cumulative changetype is adding the cell, and the action is causing the element management system to add the cell.

* * * * *